Figure 1:
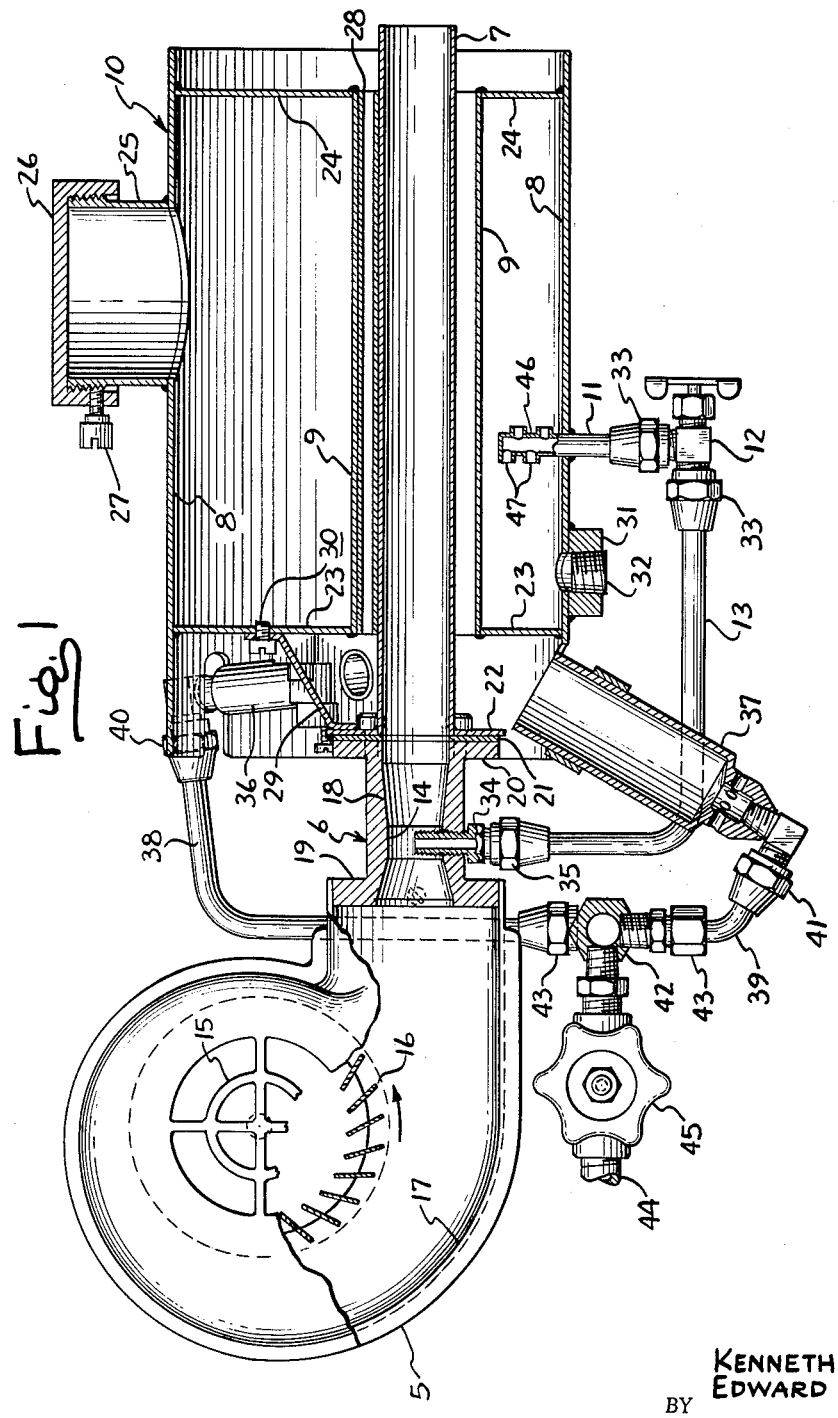

Dec. 22, 1964  K. V. FISKE ETAL  3,161,985
FOG GENERATOR
Filed April 29, 1963  2 Sheets-Sheet 1

INVENTORS
KENNETH V. FISKE
EDWARD P. SODER
BY
Gary, Desmond & Parker
ATTYS.

Dec. 22, 1964   K. V. FISKE ETAL   3,161,985
FOG GENERATOR

Filed April 29, 1963   2 Sheets-Sheet 2

Fig. 2

INVENTORS
KENNETH V. FISKE
EDWARD P. SODER
BY
Gary, Desmond & Parker
ATTYS.

United States Patent Office 3,161,985
Patented Dec. 22, 1964

3,161,985
FOG GENERATOR
Kenneth V. Fiske, Woodstock, and Edward P. Soder, Antioch, Ill., assignors of fifty percent to Velsicol Chemical Corporation, Chicago, Ill., a corporation of Illinois and fifty percent to Burgess Vibrocrafters, Incorporated, Grayslake, Ill., a corporation of Delaware
Filed Apr. 29, 1963, Ser. No. 276,400
5 Claims. (Cl. 43—129)

This invention relates to fog penetration and more particularly to an apparatus for the generation of fogs of various materials, and particularly fogs of solid and viscous liquid pesticides.

It has heretofore been known to apply certain materials, such as medicants, pesticides, and the like, as a fog of a solution of the material to obtain wide and efficient distribution of the material into the atmosphere or into confined spaces. For example DDT, a common insecticide, can be dissolved in a solvent, such as mineral oil and then pumped through a spray nozzle or other device and then heated to create a fog. Although the common devices are useful for normally liquid materials which readily flow or dissolve in solvents, these devices are unsatisfactory when it was desired to create the fog of a solid or a viscous liquid or a material without solvent. Moreover, devices having tubes of narrow diameter and/or pump mechanisms quickly become plugged if the material tends to form a sludge or precipitate from solution.

Therefore, one object of the present invention is to provide an apparatus for generating a fog of a solid, viscous liquid, or non-readily dissolvable material.

Another object of the present invention is to provide an apparatus which eliminates spray nozzles, pump mechanisms and coils of narrow internal diameter.

Still another object of this invention is to provide a fog generation apparatus which is readily portable and contains a minimum of moving parts contacting the material which is to be generated into a fog.

These and other objects and advantages of the present invention will be apparent from the following specification and accompanying drawings, in which:

FIG. 1 is a longitudinal partial cross section of the apparatus of the present invention, and FIG. 2 is a diagrammatic fragmentary side elevational view of seed planting apparatus with the apparatus of FIG. 1 installed thereon and in operation therewith.

Referring to FIG. 1, this figure shows the apparatus of the present invention in detail. The apparatus comprises an electrically operated air blower 5, which may be of the centrifugal force type as shown, a venturi tube 6 mounted in the discharge of blower 5, an elongated heated discharge tube 7 extending from the discharge of venturi tube 6, a tank 10, preferably a cylindrical, annular tank, defined by the walls 8 and 9, with wall 9 defining a cylindrical annular space and being in spaced relationship with the external surface of discharge tube 7, an outlet pipe 11 in the bottom of tank 10 leading through wall 8 to metering means, such as needle valve 12 as shown, and a branch tube 13 leading from the metering means, such as needle valve 12, to venturi tube 6 in communication therewith at the throat 14 thereof.

More specifically, air blower 5 may comprise an electrically operated blower motor (hidden from view by guard grill 15) in driving relationship with rotor 16 in housing 17. Venturi tube 6 may be a casting or a machined pipe or bar having an internal surface 18 conforming to recognized venturi tube design and having a flange 19 at its inlet end in connection with the housing 17 of blower 5 at its discharge, and a flange 20 at the discharge end of venturi tube 6 in supporting connection with gasket 21 and flange 22 on heated tube 7.

Tank 10 may be conveniently constructed of welded metal walls 8, 9, 23 and 24, which are preferably of stainless steel when the material to be generated into a fog has a corrosive effect, or may be of ordinary steel when said material is relatively non-corrosive. Access is provided to tank 10 by means of a fill pipe 25 at the top of tank 10 disposed in wall 8. Fill pipe 25 is normally covered by cover 26 which may be held securely thereto by screw threads (not shown) or by set screw 27. Wall 9 is in spaced relationship with the external surface of tube 7 and this relationship may be conveniently maintained by disposing a plurality of spacers, such as hollow tube 28, and preferably at least three such tubes equidistantly spaced from each other and longitudinally disposed within the annular space formed by, and in abutting communication with, the exterior surface of tube 7 and wall 9. Tank 10 is also held in position by means of one or more supporting brackets 29 fastened to flange 22 and in supporting connection with wall 23, such as by being held in rigid connection therewith by bolt 30. Tank 10 may also have a drain disposed therein, such as drain 31 disposed in wall 8 normally closed by drain plug 32.

Metering means, such as needle valve 12 may be connected to pipes 11 and 13 by suitable connectors, such as tubing connectors 33. Pipe 13 may also be maintained in communication with venturi tube 6 at its throat 14 by means of a threaded hollow plug 34 threaded into a perpendicular hole bored in venturi tube 6 at its throat 14, and a third tubing connector 35 fitted thereon and holding the end of pipe 13 which is opposite to valve 12. The hollow plug or nozzle 34 also may serve as a control on the amount of suction created in pipe 13 by adjusting the distance plug 34 penetrates into venturi tube 6 at its throat 14. For example, satisfactory results are obtained when plug 34 penetrates to a distance of ½ of the diameter of throat 14.

The other remaining parts in FIG. 1 are primarily the burner units 36 and 37 and their fuel supply apparatus. A plurality of vaporized fuel burners 36 and 37 are positioned facing the annular space between heated tube 7 and wall 9 of tank 10, so that the flame therefrom is directed toward the external surface of tube 7 and the heat passes through the said annular space. The fuel burners may be all the same size, such as 0.014 inch pintle burner nozzles, shown as burner 36 or may be larger units to supplying a larger quantity of heat, for example burner 37. Suitable fuel, such as liquefied gas fuel, for example compressed propane, is supplied to burners 36 and 37 by lines 38 and 39 connected to burners 36 and 37 by tubing connectors 40 and 41 respectively. Lines 38 and 39 are connected to a fuel distribution manifold 42 by tubing connectors 43. Manifold 42 is supplied with suitable fuel from a tank (not shown) through line 44 in which is disposed regulator valve 45 to control the supply of fuel to the burners 36 and 37.

In one specific embodiment of this invention the flow of material from tank 10 to venturi tube 6 is facilitated by a vertical pipe 46 extending from the junction of pipe 11 and wall 8 into tank 10 in which are positioned a plurality of horizontal nipples 47 through which the liquid material from tank 10 may readily flow. Use of this device greatly facilitates the flow of material from tank 10 and eliminates plugging of the entrance to pipe 11, which often occurs when the entrance to pipe 11 is merely an aperture in wall 8.

In operation, tank 10 is charged through fill pipe 25 with the suitable solid or liquid material which is to be generated into a fog. Fuel supply regulatory valve 45 is opened and burners 36 and 37 are ignited, thus heating the material in tank 10 through wall 9. After the material in tank 10 has at least partially melted if a solid, or is readily flowable if normally a liquid, air blower 5 is started forcing a moving stream of air through venturi tube 6 and heated tube 7 creating a vacuum in tube 13. Metering means, such as needle valve 12, is then adjusted to admit the desired flow of material from tank 10 to enter venturi tube 6, through tube 13, where it is atomized by the stream of air and then vaporized in heated tube 7. A dense fog of the material in tank 10 is thus obtained at the discharge of tube 7. Once adjusted, the apparatus will automatically and continuously generate the desired fog.

FIG. 2 illustrates the utilization of the apparatus of the present invention with conventional seed planting equipment to simultaneously treat seeds and soil with the fog of a pesticide. Referring to FIG. 2, the conventional seed planting equipment comprises a drawing bar 50 which at one end is attached to pulling means, such as a farm tractor (not shown) and at the other end is in connection with the planting shoe 51, seed hopper 52, and body member 53. This connection may be obtained through suitable linking members, such as member 54. Body member 53 supports the fertilizer hopper 55, and itself is supported by axle bearing housing 56. In normal operation the seed planter is towed behind a tractor or other vehicle, and the blade 57 of planting shoe 51 slices open the soil to a predetermined depth, usually from two to six inches. Simultaneously, seeds 58 from hopper 52 drop into the bottom of the opening in the soil, and fertilizer is spread upon the soil from hopper 55 through flexible tubing 59. The wheel 60, which also supports body member 53, compacts the soil 61 over seeds 58 to complete the planting.

In the improved planting operation performed with the apparatus of the present invention, as illustrated in FIG. 2, the apparatus of FIG. 1 is mounted on body member 53 by means of suitable supporting brackets 62. Vaporized fuel, such as liquefied propane gas is supplied to the fuel supply line 44, from a fuel tank (not shown), which may conveniently be mounted on body member 53. The discharge end of tube 7 of FIG. 1 is connected to a flexible hose 64 which communicates with a rigid pipe 65 mounted in planting shoe 51. In operation, the fog generator is discharged through flexible pipe 64 and pipe 65 into planting shoe 51, where it settles onto the soil 61 and the seeds in the opening in the soil. The seeds 58 also contact the fog as they pass through the shoe 51 and drop to the soil. In this manner both seeds and soil are treated with pesticide by the apparatus of the present invention.

In a typical operation with the apparatus mounted as shown in FIG. 2, tank 10 was charged with solid technical heptachlor. Technical heptachlor is a commercial product which usually contains about 72%, and may contain from about 60% to about 95%, of heptachlor with the remainder being about 28%, but which may vary from about 5% to about 40%, of related compounds occurring in the normal manufacturing process. The fuel burners which were supplied with liquefied propane gas as previously described, were ignited and subsequently melted the solid technical heptachlor in tank 10 by heating the solid at from about 140° F. to about 250° F. The blower was started by connecting the motor to the electrical system of a tractor which was towing the apparatus at a rate of four miles per hour. The needle valve 12 in FIG. 1 was then opened and the melted technical heptachlor was forced by vacuum into venturi tube 6 where it was atomized to a fine liquid spray. The spray was vaporized in tube 7 which was heated by the fuel burners at from about 600° to about 1000° F. to generate a dense fog of the technical heptachlor. The planting shoe 51 sliced open the soil to a depth of about three inches and intermittently corn seeds were dropped into the planting shoe 51 and hence into the opening. Dense fog of technical heptachlor was discharged into the shoe at a rate of about 45 grams per minute. In this manner, rows of corn seeds were planted in which both the seeds and the soil were treated with technical heptachlor.

We claim:

1. A fog generator comprising an air blower, a venturi tube in communication with and secured at its inlet end to the discharge end of the air blower, a discharge tube extending from and secured to the discharge end of the venturi tube, an endwise closed tank mounted in annularly spaced relationship about said discharge tube, means for introducing material to said tank to be heated therein, a liquid conduit in communication at one end with the interior of the tank, means in said conduit for metering a heated liquid in its passage therethrough, the opposed end of said conduit being secured to and in communication with the venturi tube at the throat thereof, fuel burner means leading to the annular space between the external surface of the discharge tube and the tank, and means for controlling a supply of fuel to the fuel burner means.

2. A fog generator comprising an air blower, a venturi tube in communication with and secured at its inlet end to the discharge end of the air blower, a discharge tube extending from and secured to the discharge end of the venturi tube, an endwise closed tank, spacer means retaining said tank in annularly spaced relationship about said discharge tube, means for introducing material to said tank to be heated therein, a liquid conduit in communication at one end with the interior of the tank, needle valve means in said conduit for metering a heated liquid in its passage therethrough, the opposed end of said conduit being secured to and in communication with the venturi tube at the throat thereof, fuel burner means leading to the annular space between the external surface of the discharge tube and the tank, and means for controlling a supply of fuel to the fuel burner means.

3. A fog generator comprising an air blower, a venturi tube in communication with and secured at its inlet end to the discharge end of the air blower, a discharge tube extending from and secured to the discharge end of the venturi tube, an endwise closed tank mounted in annularly spaced relationship about said discharge tube, means for introducing material to said tank to be heated therein, a liquid conduit in communication at one end with the interior of the tank, means in said conduit for metering a heated liquid in its passage therethrough, the opposed end of said conduit being secured to and in communication with the venturi tube at the throat thereof and terminating therein in a transversely adjustable apertured nozzle, fuel burner means leading to the annular space between the external surface of the discharge tube and the tank, and means for controlling a supply of fuel to the fuel burner means.

4. A fog generator comprising an air blower, a venturi tube in communication with and secured at its inlet end to the discharge end of the air blower, a discharge tube extending from and secured to the discharge end of the venturi tube, an endwise closed tank mounted in annularly spaced relationship about said discharge tube, means for introducing material to said tank to be heated therein, a liquid conduit in communication at one end with the interior of the tank and an extension of said conduit projecting with the tank embodying a plurality of spaced nipples, means in said conduit for metering a heated liquid in its passage therethrough, the opposed end of said conduit being secured to and in communication with the venturi tube at the throat thereof, fuel burner means including a plurality of angularly spaced nozzles leading to the annular space between the external surface of the discharge tube and the tank, and means for controlling a supply of fuel to the fuel burner means.

5. A generator for use in forming a fog from a material, said generator including: a tank having a top, a bottom, two ends, a passageway extending approximately horizontally through the tank from end to end, and a fill opening in the top of the tank for introducing the material into the tank, said passageway being off-set in a downwardly direction from the center of said ends; a fogging tube extending through and substantially beyond the end of said passageway, said tube being smaller in cross section than the passageway to define a space between the tube and the tank; a blower connected to one end of the tube to force air therethrough; means to withdraw metered amounts of liquid from the tank and to introduce it into said end of the tube, said means including a pipe communicating with the bottom of the tank and a connecting pipe communicating with said end of the tube; and burner means about said end of the tube to heat said end of the tube with the combustion gases passing through said space.

References Cited in the file of this patent

UNITED STATES PATENTS

| | | |
|---|---|---|
| 1,587,736 | Schenck | June 8, 1926 |
| 2,012,973 | Parker | Sept. 3, 1935 |
| 2,422,024 | Levey et al. | June 10, 1947 |
| 2,662,332 | McIntire | Dec. 15, 1953 |
| 2,734,439 | Padrick | Feb. 14, 1956 |
| 2,926,855 | Durr et al. | Mar. 1, 1960 |

OTHER REFERENCES

France, 61,798, Dec. 8, 1954, 1st. Addition of French Patent 1,051,128, Sept. 9, 1953.